United States Patent [19]

Pringle et al.

[11] 4,231,223
[45] Nov. 4, 1980

[54] THERMAL ENERGY SCAVENGER (ROTATING WIRE MODULES)

[76] Inventors: William L. Pringle, 999 Lake Shore Rd., Grosse Pointe Shores, Mich. 48236; Peter A. Hochstein, 14020 Fifteen Mile Rd., Sterling Heights, Mich. 48077; Harold W. Milton, Jr., 3318 Tothill Rd., Troy, Mich. 48084

[21] Appl. No.: 914,030

[22] Filed: Jun. 9, 1978

[51] Int. Cl.³ .............................................. F03G 7/06
[52] U.S. Cl. ................................................... 60/527
[58] Field of Search .......................... 60/527, 528, 529

[56] References Cited

U.S. PATENT DOCUMENTS

| | | | |
|---|---|---|---|
| 3,937,019 | 2/1976 | Renner | 60/527 |
| 4,014,170 | 3/1977 | Kitterman | 60/325 |
| 4,041,706 | 8/1977 | White | 60/527 |
| 4,087,971 | 5/1978 | Hart | 60/527 |

*Primary Examiner*—Allen M. Ostrager
*Attorney, Agent, or Firm*—McGlynn and Milton

[57] ABSTRACT

A thermal energy scavenger assembly including a plurality of temperature-sensitive wires made of material which exhibits shape memory due to a thermoelastic, martensitic phase transformation. The wires are placed in tension between fixed and movable plates which are, in turn, supported by a pair of wheels which are rotatably supported by a housing for rotation about a central axis. A pair of upper and lower cams are fixed to the housing and cam followers react with the respective cams. Each cam transmits forces through a pair of hydraulic pistons. One of the pistons is connected to a movable plate to which one end of the wires are connected whereby a stress is applied to the wires to strain the wires during a first phase and whereby the cam responds to the unstraining of the wires during a second phase. A housing defines fluid compartments through which hot and cold fluid passes and flows radially through the wires whereby the wires become unstrained and shorten in length when subjected to the hot fluid for causing a reaction between the cam followers and the cams to effect rotation of the wheels about the central axis of the assembly, which rotation of the wheels is extracted through beveled gearing. The wires are grouped into a plurality of independent modules with each module having a movable plate, a fixed plate and the associated hydraulic pistons and cam follower. The hydraulic pistons and cam follower of a module are disposed at ends of the wires opposite from the ends of the wires at which the same components of the next adjacent modules are disposed so that the cam followers of alternate modules react with one of the cams and the remaining cam followers of the remaining modules react with the other cam. There is also included stress limiting means in the form of coil springs associated with alternate ends of the wires for limiting the stress or strain in the wires.

17 Claims, 10 Drawing Figures

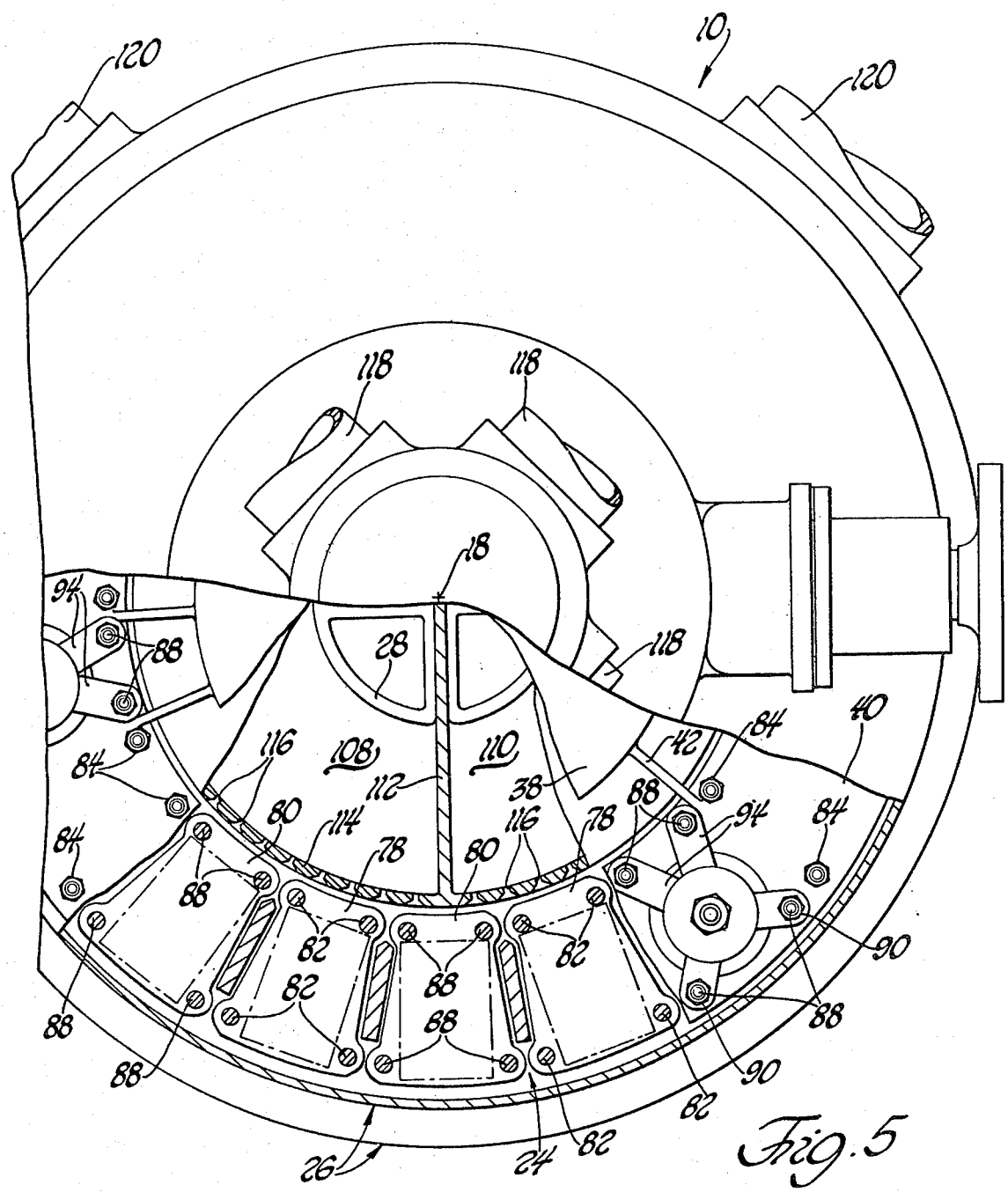
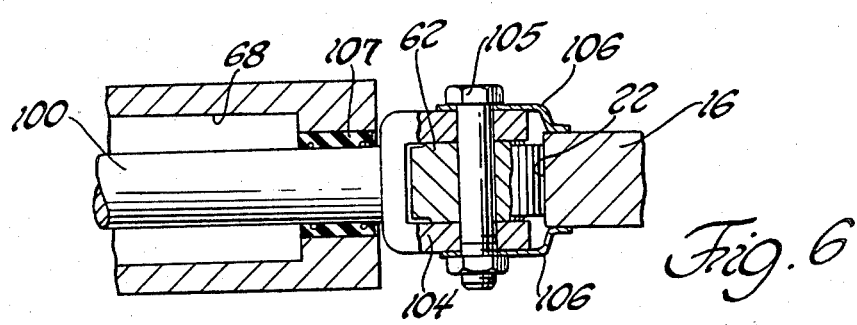
Fig. 5
Fig. 6

THERMAL ENERGY SCAVENGER (ROTATING WIRE MODULES)

BACKGROUND OF THE INVENTION (1) Field of the Invention

This invention relates to a thermal energy scavenger or a thermal energy converting assembly of the type for converting heat energy into mechanical energy and, more specifically, to such an assembly utilizing a plurality of temperature-sensitive elements made of a material which exhibits shape memory due to a thermoelastic, martensitic phase transformation whereby less energy is required to strain the elements in a cold condition than the energy returned when the elements become unstrained as they are heated to a higher temperature.

During recent years various materials comprising metal alloys have been developed which have a shape memory characteristic based upon thermoelastic, martensitic phase transformations which are stress or strain dependent. Basically, such alloys exhibit a stable shape in a phase above a given transition temperature and experience a transformation to a martensitic phase at a temperature below the transition temperature. The alloys have a much lower effective modulus at the martensitic phase below the transition temperature thereby requiring a relatively small amount of energy in the form of stress for straining the alloy when at the lower temperature whereas the alloy provides much more energy as it unstrains and returns to its original shape when it reaches a higher temperature above the transition temperature. Examples of alloys which have this shape memory characteristic are titanium-nickel; copper-aluminum-nickel; copper-zinc; iron-platinum and gold-cadmium.

A discussion of the shape memory characteristics in a number of alloys is set forth in the Journal of Material Science; 1974, Volume 9, Pages 15-21 by the authors L. Delaey, R. V. Krishnan and H. Tas. Further discussions are set forth in Metallurgical Transactions; 1975, Volume 6A, Page 29 by H. C. Tong and C. M. Wayman.

Further description of materials having the shape memory characteristic are set forth in U.S. Pat. No. 3,174,851 granted Mar. 23, 1965 to William J. Buehler and Raymond C. Wiley and U.S. Pat. No. 3,558,369 granted to F. E. Wang and William J. Buehler on Jan. 26, 1971.

(2) Description of the Prior Art

There have been efforts to utilize these materials, which have shape memory characteristics, in thermal energy converting assemblies and such assemblies have proved that the materials may be so utilized. Such assemblies strain the material having the shape memory characteristic and extract energy but have not efficiently utilized the material in the mamner in which the material is strained nor maximized the amount of material strained in a given space.

SUMMARY OF INVENTION

A thermal energy scavenger assembly including a plurality of temperature-sensitive elements made of material which exhibits shape memory due to thermoelastic, martensitic phase transformation, with the elements being elongated with first and second ends. A reaction means reacts with the elements for applying a stress to the elements to strain the elements during a first phase and for responding to the unstraining of the elements during a second phase. A carriage means supports the first and second ends of the elements for allowing the elements to be placed in tension while reacting with the reaction means. The carriage means includes a plurality of independent modules and each of the modules supports a group of elements so that each group of elements react collectively with the reaction means and independently of the groups of other modules, with the elements in each group being parallel to one another. The reaction means comprises cam means disposed about a central axis with at least one cam surface disposed about the periphery of the cam means. A support means supports the cam means and the carriage means for allowing relative movement between the cam means and the carriage means to extract energy as the elements unstrain and shorten in length during the second phase. Each of the modules includes a cam follower for engaging the cam means and hydraulic means is disposed between each of the cam followers and the group of elements of the module for transferring reaction forces between the cam means and the elements of each group.

PRIOR ART STATEMENT

A very basic prior art assembly is disclosed in U.S. Pat. No. 3,403,238 granted Sept. 24, 1968 to William J. Buehler and David M. Goldstein, which patent merely discloses the simple concept of placing a shape memory material of nickel-titanium under stress to strain the material by cantilevered bending or torsional twisting at a relatively low temperature and extracting the increased energy resulting from the unstraining or return of the material to its original unbent or untwisted shape as it reaches a higher temperature. Tests have also been conducted on an assembly utilizing rods of a material having a shape memory. The rods extend between nonparallel rotating discs so that synchronous rotation of the discs increases the distance between corresponding points of attachment of the rods on their perimeters during one-half revolution and decreases the distance between the ends of the rods during the other half revolution whereby the rods are strained by being placed in tension at a lower temperature and contract to their original length when heated to a higher temperature. Such tests were conducted by the Lawrence Berkley Laboratory of the University of California and reported in their report NSF/R Ann/SE/AG-550/FR 75/2 entitled "Nitinol Engine Project Test Bed" dated July 31, 1975. The shape memory material utilized in that project was 55-Nitinol from the Timet Division of the Titanium Corporation of America, Toronto, Ohio with a chemical composition of 55.38% nickel; 0.05% iron; 0.004% nitrogen and the balance titanium.

A further such assembly comprising this material is disclosed in U.S. Pat. No. 3,913,326 granted Oct. 21, 1975 to Ridgway M. Banks. In this assembly the material is in the form of wires which are in a U shape in the hot side and are straight or relatively straight in the cold side. Two other assemblies are disclosed in U.S. Pat. No. 4,037,411 granted July 26, 1977 to Peter A. Hochstein. One of the assemblies bends strips of metal in a cantilevered fashion and the other assembly twists strips of metal along their length.

In none of the prior art assemblies, however, is there the maximum use of the metal as in accordance with the subject invention wherein a plurality of temperature-sensitive elements made of the material having a shape memory react with cam means for applying a stress to the elements to strain the elements during a first phase and for responding to the unstraining of the elements during a second phase with the cam means disposed about a center axis with at least one axially extending cam surface disposed about the radial periphery thereof and carriage means supporting the elements in parallel relationship to the central axis for allowing the elements to be placed in tension while reacting with the cam means and support means supporting the cam means and carriage means for relative movement therebetween to extract energy as the elements unstrain and shorten in length during the second phase to provide a compact assembly with a relatively high energy output capacity.

BRIEF DESCRIPTION OF THE DRAWINGS

FIG. 5 is a top plan view similar to FIG. 2 but showing the assembly partially broken away and in cross section;

FIG. 6 is a fragmentary cross-sectional view taken substantially along line 6—6 of FIG. 7;

DESCRIPTION OF THE PREFERRED EMBODIMENT

Figure 10:
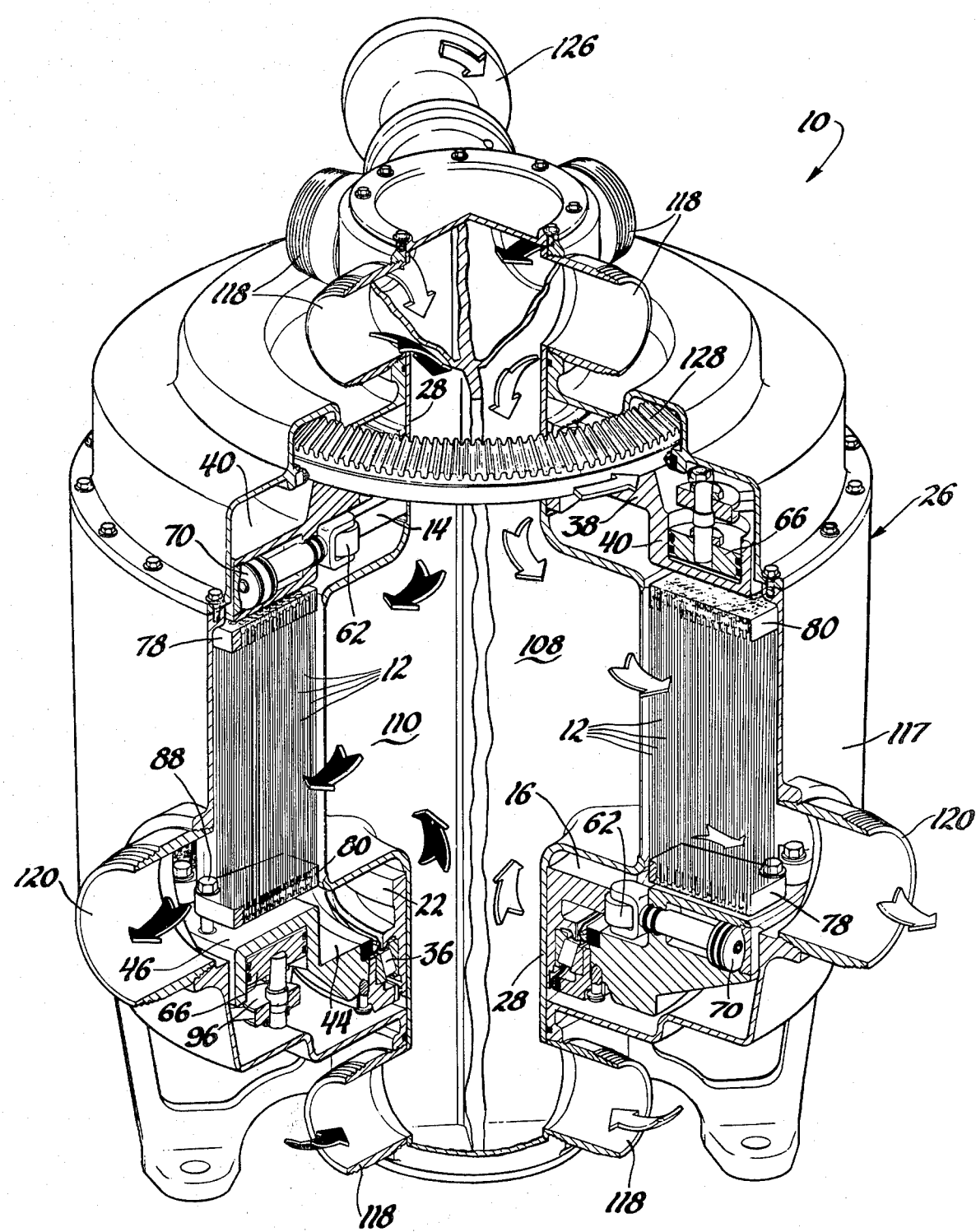
FIG. 10 is a perspective view partially cut away and in cross section showing the preferred embodiment of the subject invention.

A thermal energy scavenger assembly constructed in accordance with the subject invention is generally shown at 10, with the combination of components best illustrated in FIG. 10.

The assembly 10 includes a plurality of temperature-sensitive elements taking the form of elongated wires 12 having a circular cross section with first and second ends and made of material which exhibits shape memory due to thermoelastic, martensitic phase transformation. The material may be any one of those discussed above requiring less energy for straining the elements at a relatively cold temperature than may be extracted from the elements as they return to the original unstrained shape while at a higher temperature, i.e., shape memory characteristic.

The assembly 10 also includes reaction means or cam means comprising a pair of first and second or upper and lower, axially spaced cams 14 and 16 respectively. The cams 14 and 16 react with the wire elements 12 for applying a stress to the elements 12 to strain the elements 12 during a first phase and for responding to the unstraining of the elements 12 during a second phase. The phase transformation occurs as the elements 12 pass through a transition temperature between a relatively cool temperature below the transition temperature and a relatively warm temperature above the transition temperature. The first phase occurs while the elements are at the relatively cool temperature below the transition temperature whereas the second phase occurs while the elements are at the relatively warm temperature below the transition temperature. The cams 14 and 16 are disposed about a central axis 18. The cam 14 has an axially extending cam surface 20 disposed about the radial periphery thereof and the cam 16 has an axially extending surface 22 disposed about the radial periphery thereof.

The assembly 10 also includes carriage means generally shown at 24 for supporting the wires 12 in parallel relationship to the central axis 18 and in parallel relationship with one another for allowing the elements or wires 12 to be placed in tension while reacting with the cams 14 and 16. Said another way, the carriage means 24 positions or places the wires 12 in tension in response to reaction with the cams.

There is also included a support means defined by the housing generally indicated at 26 which supports the cams 14 and 16 and the carriage means 24 for allowing relative movement between the cams 14, 16 and the carriage means 24 to extract energy as the wires 12 unstrain and shorten in length during the second phase. More specifically, the cams 14 and 16 are fixed to the support means defined by the housing 26 and the carriage means 24 is rotatably supported by the support means defined by the housing 26 for rotation about the central axis 18. The cams 14 and 16 are secured to the inner wall 28 of the housing by being welded thereto. The cam 14 is an integral part of a cam and bearing support member 30 and the cam 16 is an integral part of a cam and bearing support member 32. The cam and bearing support member 30 supports the bearing assembly 34. The cam and bearing support member 32 supports a bearing assembly 36. The bearing assemblies 34 and 36 rotatably support the carriage means 24.

The carriage means 24 includes an upper rotating wheel having an inner hub portion 38 and an outer rim portion 40 with the two portions interconnected by circumferentially spaced spokes 42 and a lower rotating wheel including an inner hub portion 44, an outer rim portion 46 with circumferentially spaced spokes 48 interconnecting the portions 44 and 46. The wheels are axially spaced from one another along the central axis 18 of the assembly. The upper wheel is connected to a ring member 50 by a plurality of bolts 52 and the ring member 50 is supported by the bearing 34 for rotatably supporting the upper wheel. The lower wheel is connected by the bolts 56 to a ring member 54 which, in turn, is supported by the bearing 36 for rotatably supporting the lower wheel. The ring member 54 has a flange with a seal 58 secured thereto. Additionally, seal assemblies 60 are disposed between the respective wheels and flanges of the cam and bearing support members 30 and 32.

Figure 4:
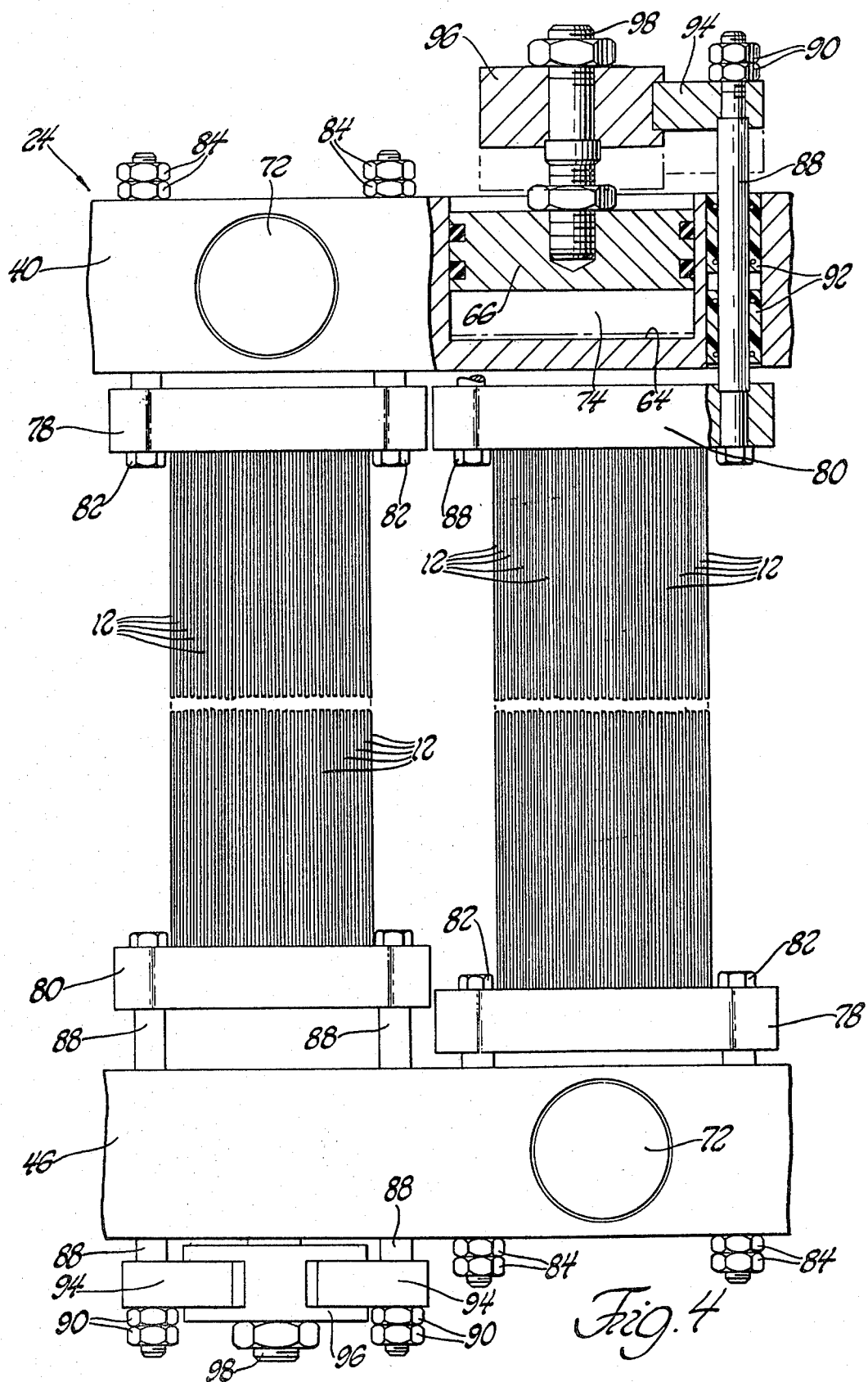
FIG. 4 is a fragmentary cross-sectional view taken substantially along line 4—4 of FIG. 3.

The carriage means 24 includes a plurality of independent modules disposed in a circle about the central axis 18, two of which are illustrated in FIG. 4. Each of the modules supports a group of the wires 12 so that each group of wires react in unison with one of the cams 14 or 16 and independently of the groups of wires 12 of other modules. Each of the modules includes a cam follower assembly 62 for engaging one of the cams 14 or 16. Further, each of the modules includes hydraulic means disposed between each of the cam follower assemblies 62 and the associated group of wires 12 of each module for transferring reaction forces between the cams 14 and 16 and the wires 12 of each group thereof. The hydraulic means is disposed between the wires 12 and the reaction means defined by the cams 14 and 16 for transferring reaction forces between the reaction means and the wires 12 through a fluid under pressure. The hydraulic means includes a plurality of independent hydraulic packages with each hydraulic package associated with one of the modules. The hydraulic package associated with each module includes a first hydraulic chamber 64 disposed in one of the outer rim portions 40 or 46 with a first piston 66 movably disposed in each chamber 64 to define an expandable hydraulic volume 74. Each hydraulic package also includes a second hydraulic chamber 68 disposed in one of the rim portions 40 or 46 and a second piston 70 movably disposed in each chamber 68 to define a hydraulic volume 76 which may expand and contract. The chambers 68 are closed by the plugs 72. The expandable volume 74 defined by the chamber 64 and the piston 66 is in fluid communication by a hydraulic line (not shown) with the expandable volume 76 defined by the piston 70, the chamber 68 and the closure plug 72. The hydraulic package associated with each module is disposed at the ends of the wires 12 in that module opposite from the element ends at which the hydraulic package of the next adjacent modules are disposed. In other words, the chambers 64 and 68 are alternately disposed about the circumference of each of the rim portions 40 and 46. Each of the first chambers 64 is hydraulically paired with a next adjacent chamber 76. The piston 66, as illustrated in FIG. 4, is associated with a first group of wires 12 defining a module and is hydraulically connected to the adjacent chamber 68 defined by the closure plug 72 in the rim portion 40. However, the same hydraulic package for the group of wires 12 on the left-hand portion of FIG. 4 are disposed in the lower rim portion 46. Thus, the hydraulic packages associated with the adjacent modules are disposed at opposite ends of the wires 12.

Similarly, the cam follower assemblies 62 are alternately disposed from module to module so that the cam follower assemblies 62 of alternate modules react with the upper cam 14 and the remaining cam follower assemblies 62 of the remaining modules react with the second or lower cam 16. In other words, half of the cam follower assemblies 62 extend radially from the upper rim portion 42 whereas the remaining cam follower assemblies 62 extend radially inwardly from the lower rim portion 46.

Each of the modules includes a fixed plate 78 fixedly connected to the rim portion 40 or 46 of one of the wheels and a movable plate 80 movably attached to the rim portion 40 or 46 of the other of the wheels. Each module includes a plurality of wires 12 extending between a fixed plate 78 and a movable plate 80 with the ends thereof connected to the respective fixed and movable plates 78 and 80. The fixed plates 78 are immovably connected to the rim portions 40 and 46 by bolts 82 having nuts 84 thereon. The bolts 82 extend through holes in the plate 78 such as the hole indicated at 86 in FIG. 8 and through one of the rim portions 40 or 46 for securing the plate 78 in a fixed position relative to the rim portion 40 or 46 to which it is connected.

The movable plates 80 are connected to the first ends of guide pins 88. The guide pins 88 extend through the rim portion 40 or 46 of one of the wheels to second ends which have the nuts 90 disposed thereon. Each guide pin 88 is slidably supported in bushings of bearing material 92 whereby the plates 80 may move as the pins 88 slide in the bushings 92.

Connecting means including the arms 94, the blocks 96 and threaded fastener assemblies 98 interconnect the second ends of the guide pins 88 and the associated first piston 66 for creating hydraulic pressure in the volume 74 of the chamber 64 in response to the unstraining, i.e., shortening, of the wires 12.

A piston rod 100 is connected by a bolt 102 to each of the second pistons 70 at one end and includes a U-shaped yoke 104 at the other end for rotatably supporting the roller defining the cam follower 62. Each cam follower 62 rollingly engages one of the axially extending surfaces 20 and 22 of the cams 14 and 16. The rollers 62 are supported by the yokes by means of bolts 105. Guide shields 106 are disposed on either side of the cams 14 and 16 respectively and are maintained in position by the clamping action of the bolts 105. The guide shields 106 engage opposite faces of the cams 14 and 16. The rods 100 extend through bearing sleeves 107, the bearing sleeves 107 slidably supporting the piston rods 100 for radial movement.

It will be noted that the first hydraulic piston 66 has a larger area subjected to hydraulic fluid pressure than the second hydraulic piston 70. The hydraulic pistons are in fluid communication with one another through a fluid communication means as the expandable volume 74 is in fluid communication through a hydraulic line or conduit with the expandable volume 76. It will be noted that the first hydraulic pistons 66 move axially or parallel to the central axis 18 whereas the hydraulic pistons 70 move radially relative to the central axis 18. This allows the wires 12 to extend axially and the cams 14 and 16 to project radially with a resultant compactness.

Figure 1:
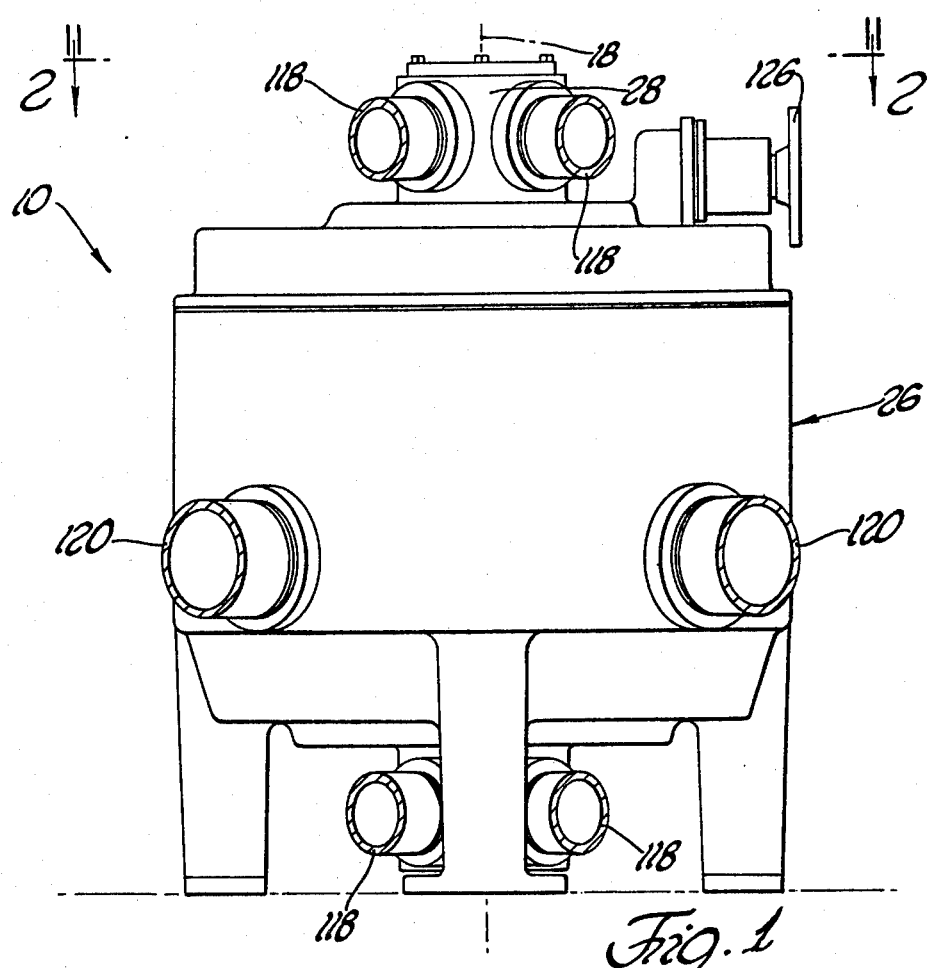
FIG. 1 is a side elevational view of a preferred embodiment of the subject invention.
Figure 2:
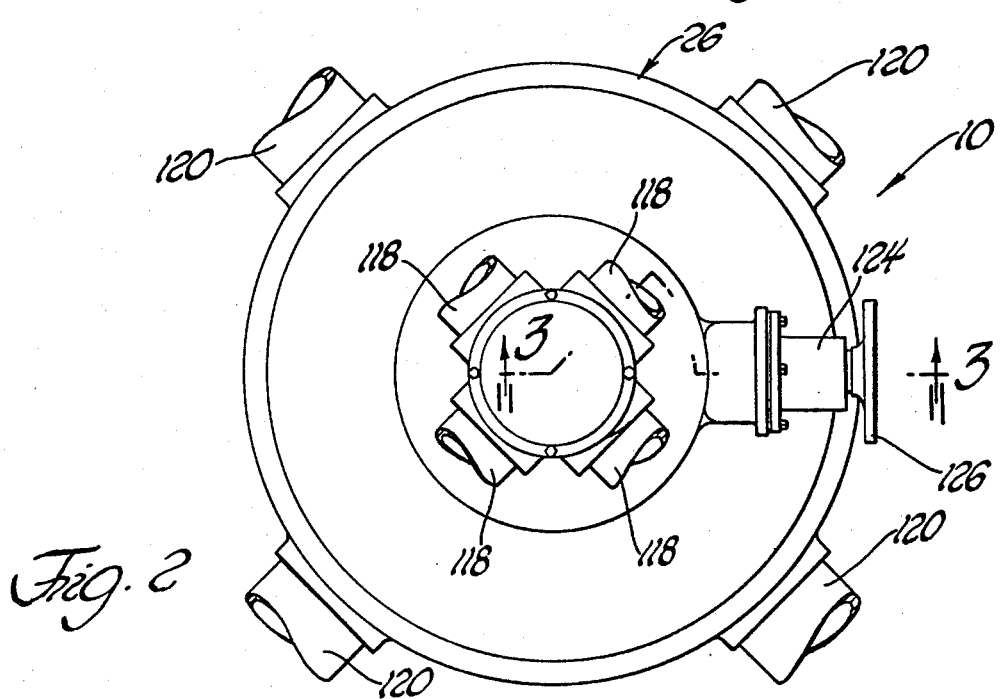
FIG. 2 is a plan view taken substantially along line 2—2 of FIG. 1.
Figure 3:
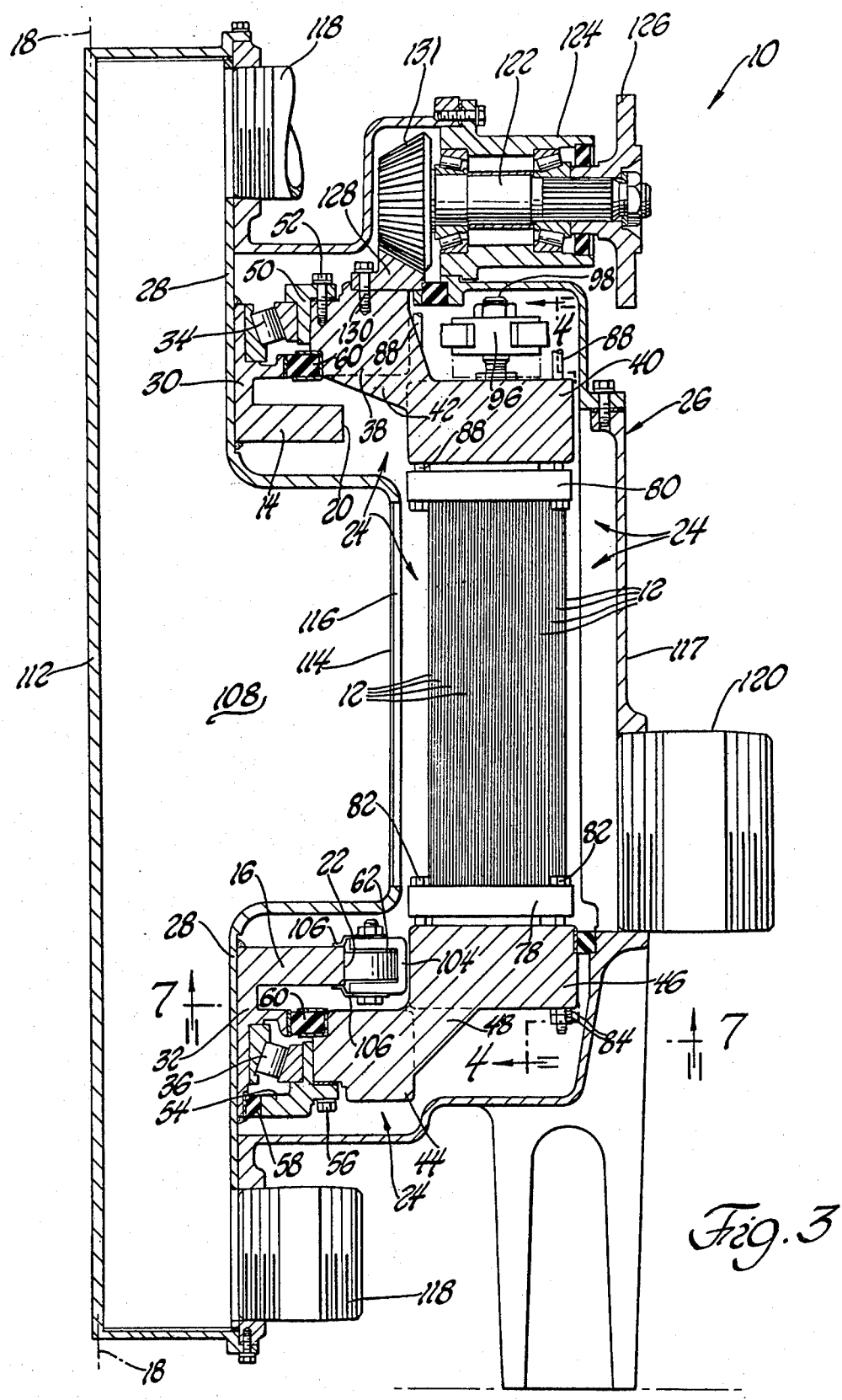
FIG. 3 is a fragmentary cross-sectional view taken substantially along line 3—3 of FIG. 2.

The support means 26 which is defined by a housing includes or defines a first compartment 108 extending in an arc circumferentially about the central axis 18 for a first portion of the circumferential periphery and is divided or separated from a second compartment 110 by a wall 112, the second compartment 110 extending in an arc about the central axis 18 for another adjacent portion of the periphery thereof. The compartment 108 is additionally defined by the wall 28 which has an outwardly disposed portion 114 with axially extending nozzle slots or passages 116 extending radially through the walls 114 from each compartment toward the wires 12. The housing also includes a plurality of inlets 118 with top and bottom inlets 118 associated with each respective compartment 108 and 110, it being appreciated that the housing is divided by four radially extending walls 112 into four compartments. Two of the compartments 108 or 110 would be for either hot or cold fluid (such as water) with the hot or cold compartments 108 or 110 being diametrically opposed. The housing also includes four outlets 120 with each outlet 120 being associated with one of the compartments 108 or 110. The housing 26 also includes an outer wall 117 disposed radially about the carriage means 24 with the fluid outlets 120 extending radially from the outer walls 117 to exhaust the fluid from the housing. The section shown in FIG. 3 is illustrated in line 3—3 of FIG. 2, but the outlet 120 is not shown along the section line 3—3 of FIG. 2; however, it has been added for purposes of clarity to show the relative position of the outlets 120 if the section line 3—3 passed through an outlet 120. Thus, hot and cold fluid may pass through the compartments 108 and 110 and radially through the wires 12 to heat and cool the wires 12 as they move or rotate about the central axis 18.

The assembly also includes an output shaft 122 rotatably supported in a housing portion 124 through appropriate bearings for rotating an output member 126. A power take-off means for transmitting the rotational movement of the carriage means to the output shaft 122 is included and comprises a beveled ring gear 128 bolted by the studs 130 to the hub portion 38 of the upper wheel and a meshing beveled pinion gear 131 which is attached to one end of the output shaft 122.

The assembly also includes stress limiting means for limiting the strain of each respective wire element 12 during the phases whereby the strain upon each wire element 12 may be greater during the first phase than during the second phase. The first phase occurs while the elements 12 are at a relatively cool temperature below the transition temperature and the second phase occurs while the elements 12 are at a relatively warm temperature above the transition temperature. The strain is the percent of elongation of each element wire 12 during the first phase when at the relatively cool temperature and is greater than the strain or percent of elongation of each element wire 12 during the second phase when the element is at the relatively warm temperature. The stress applied to each element wire 12 in reacting with the reaction means is greater during the second phase at the warmer temperature than is the stress subjected to each wire during the first phase wherein the temperature is relatively cool. The stress limiting means allows work to be efficiently extracted from the material by allowing the strain or percent of elongation of the wires 12 to be greater at the relatively cold temperature than at the relatively warm temperature. The stress limiting means is disposed between the cams 14 and 16 defining the reaction means and the wire elements 12 so that the cams 14 and 16 react with the wire elements 12 through the stress limiting means. Specifically, the stress limiting means includes a plurality of coil springs 132 which allow a lost motion between the cams 14 and 16 and the wire elements 12. More specifically, each spring 132 reacts between associated wire elements 12 and the plates 78 and 80 of the carriage means 24. Each of the plates 78 and 80 are part of the carriage means and include a plurality of counterbores 134. One of the coil springs 132 is disposed in each of the counterbores 134. Further, each of the plates 78 and 80 of the carriage means 24 includes a recess 136 in the bottom of each counterbore 134. There is also included a connecting means comprising a first plug 138 for interconnecting the wires 12 and the coil springs 132. The plugs 138 are disposed and retained in the top of each of the coil springs 132 and the wires 12 extend through the plugs 138 to be retained thereto. Specifically, the plugs 138 have passages therethrough with enlarged cavities 140 at one end with the wires 12 extending through the passages and having enlarged heads 142 disposed in the cavities. There is also included anchoring means comprising the second plugs 144 disposed in the recesses 136 with the wires 12 extending through passages and the plugs 144 to enlarged cavities at the end of the passages with the wires having enlarged heads 148 disposed in the cavity 146. The wires 12 have identical ends in that the heads 142 and 148 are identical. Thus, each coil spring 132 is disposed about two of the wires 12 and each anchoring plug 144 is connected to wires 12. The wires extend through passages in the plates 78 and 80 and then through the respective plugs 138 and 144.

Figure 8:
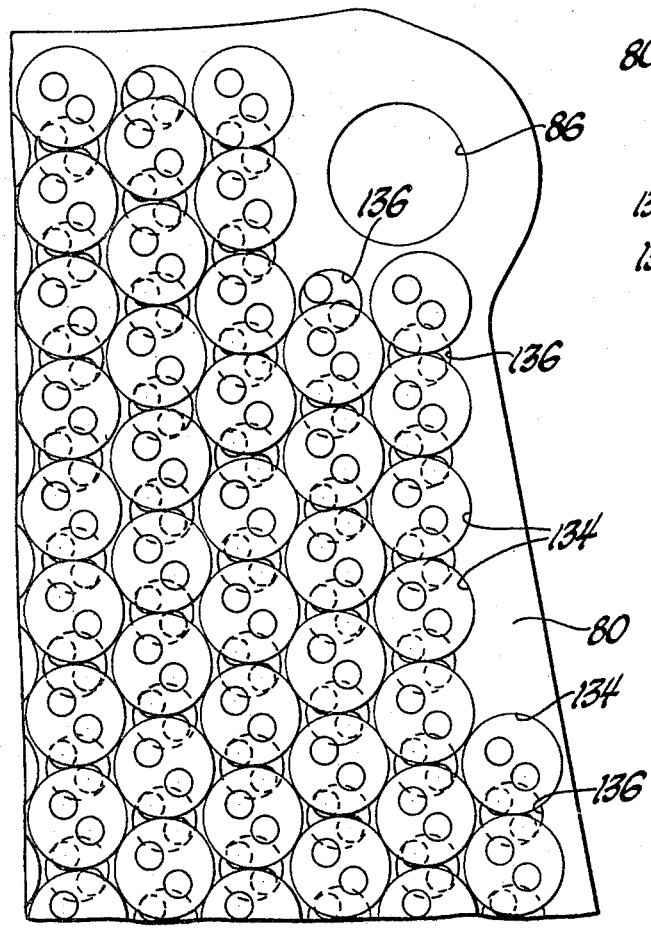
FIG. 8 is an enlarged fragmentary view showing one of the plates to which the elements are attached.
Figure 9:
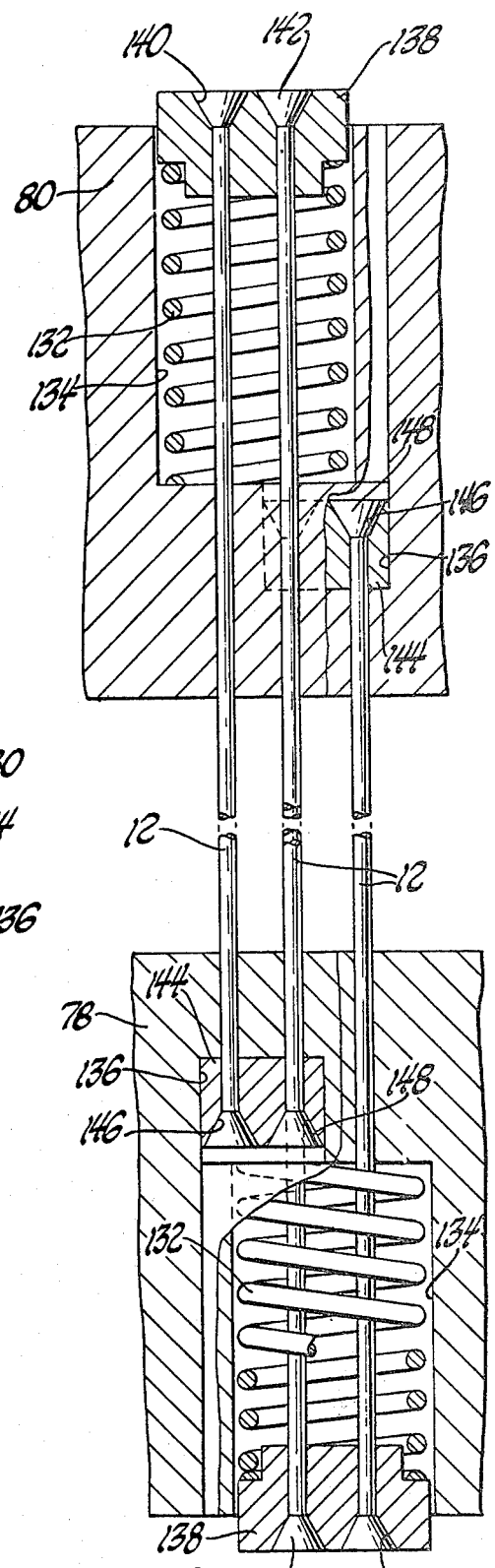
FIG. 9 is an enlarged fragmentary cross-sectional view partially broken away and in further cross section of the elements extending between the plates with stress limiting means associated therewith.

The anchoring plugs 144 are spaced longitudinally of the wires 12 from the adjacent coil springs 132 at the same ends of the wires 12 so that the anchoring plugs 144 overlap two adjacent coil springs 132 in a direction transverse to the longitudinal axis of the wires 12, as best illustrated in FIG. 8. In other words, the bottom of each coil spring 132 overlaps at least one anchoring plug 144 and overlaps two such anchoring plugs 144, as illustrated.

The springs 132 defining the stress limiting means are disposed between only one end of each of the wires 12 and the plates 78 or 80 of the carriage means for limiting the strain of the elements as stress is transmitted between the wire elements 12 and the cams 14 and 16. In other words, the springs 132 are disposed only at first ends of half of the wire elements 12 and are disposed only at the opposite or second ends of the remainder of the wire elements 12 thereby compacting the area in which the wire elements 12 are disposed. Said another way, the coil springs 132 are alternately disposed at the first and second ends of the wire elements 12.

OPERATION

The metal of which the wire elements 12 is made may be alloyed so that the transition temperature varies over a wide range. Depending upon the transition temperature of the metal in the elements 12, water warmed above the transition temperature is fed into the assembly through four of the inlets 118 so as to fill two diametrically opposite pairs of the chambers 108 or 110 while colder water below the transition temperature is fed through four inlets 118 so as to fill the other two paired compartments 108 or 110 with cold water. It will be appreciated that cold water is subjected to two pair of inlets 118 which are diametrically opposed while warm water is supplied to the other two pair of inlets 118 which are diametrically opposed and 90 degrees apart from the inlets for the cold water, as there are two cold water compartments 108 or 110 and two warm water compartments 108 or 110. The water passes through the compartments 108 and 110 out through the nozzle slots 116 and radially through each group of wires 12 in each module and out the outlets 120.

Figure 7:
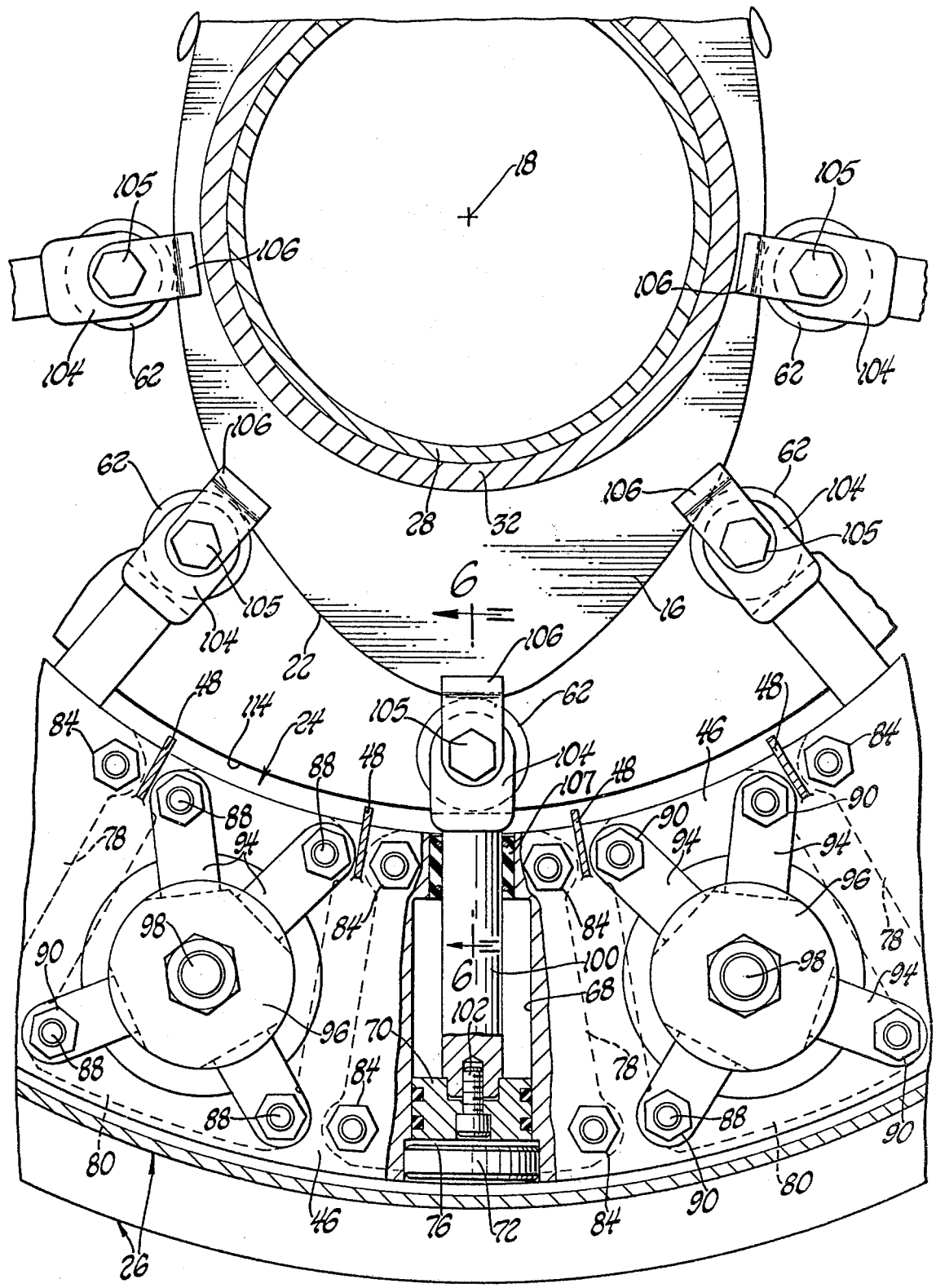
FIG. 7 is a cross-sectional view partially broken away and in cross section and taken substantially along line 7—7 of FIG. 3.

When the wires 12 are subjected to the relatively cool temperature below the transition temperature they become relatively soft and are subjected to a force resulting in a stress upon the wires 12. While the wires 12 are in the relatively cool state, the cam followers 62 are moving toward the high point of the cams so as to force the pistons 70 toward the position illustrated in cross section in FIG. 7 as the carriage means 24 is rotating in a clockwise direction as illustrated in FIG. 7. Such movement contracts the volume 76 forcing hydraulic fluid to the underside of the associated piston 66 to increase the volume of the chamber 74 and move the piston 66 upwardly, as viewed in FIG. 4. Such movement of piston 66 is transferred through the guide pins 88 to move the movable plate 80 upward to stretch or elongate the wires 12, thus applying a stress to the wires 12. Such a stress results in strain which is the change in length of the wires 12 as a result of being subjected to stress. Strain is described in physics formula as the change or elongation in length of the wire 12 divided by the original length of the wire 12. As related hereinbefore, the permissible strain of the wires 12 while in the relatively cool state is greater than the permissible strain of the wires while in the warm state.

Once a cam follower 62 passes the high point and the cam begins moving down the cam, as would the roller cam follower 62 shown in the middle of FIG. 7 as it moves clockwise, the wires 12 are subjected to relatively warm water passing out through the slots 116 from one of the compartments. Thus, the wires 12 are heated to a temperature above the transition temperature and contract or shorten to return to their original length. In so doing, the movable plate 80 is moved downwardly to move the piston 66 downwardly forcing hydraulic fluid to the expandable volume 76 in the next adjacent piston which drives the rod 100 and the associated cam follower 62 against the cam surface which results in a force vector to rotate the carriage means 24. It will be appreciated that less energy is required to elongate the wires in the relatively cool state than results from the wires contracting in the relatively warm state whereby the wires convert heat to mechanical energy during the unstraining thereof.

Since there are two quandrants for each of the warm and cool liquids the wires are strained and unstrained twice during each revolution.

Since it takes less force to strain the wires in the cold state, the springs 132 are selected such that there is minimal compression of the springs 132 when the wires 12 are being strained and elongated in the relatively cold state. However, when the wires 12 move to the relatively warm state above the transition temperature there is a great deal more resultant stress yet the wires have less permissible strain in the warm state because the effective modulus of elasticity of the elements 12 changes between the relatively cool and relatively warm temperatures. The springs 132 are stress limiting means for limiting the strain in the elements 12 during the warm state as the springs 132 are compressed to prevent the stress in the wires 12 from exceeding the predetermined limit and thereby preventing the permissible strain of the wires from being exceeded.

It will be appreciated that the strain in a material having a shape memory characteristic may result from various different stresses and the stress limiting means for limiting the strain (whereby the strain may be greater in the relatively cold state than in the relatively warm state) may take forms other than the springs illustrated herein. For example, the stress limiting means may be a form of a slip clutch, elastic member or other lost motion device which will allow the most efficient utilization of the material by allowing a greater strain in the relatively cold state, which is the phase in which the stress applied to the material results in more strain, than the strain allowed in the material in the second phase when the material is unstraining and doing work.

The fluid utilized to provide the different temperatures is preferably a liquid but may also take the form of a gas or gases or a combination of liquid and gas.

Another feature of the embodiment illustrated is that it is symmetrical about a plane extending diametrically through the assembly (as through the high points of the cams) and therefore may rotate in either direction once started in that direction. In other words, the direction of rotation may depend upon the direction in which the assembly is initially rotated for start-up.

The invention has been described in an illustrative manner, and it is to be understood that the terminology which has been used is intended to be in the nature of words of description rather than limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A thermal energy scavenger assembly comprising: a plurality of temperature-sensitive elements made of material which exhibits shape memory due to thermoelastic, martensitic phase transformation; said elements being elongated with first and second ends; reaction means reacting with said elements for applying a stress to said elements to strain said elements during a first phase and for responding to the unstraining of said elements during a second phase; carriage means supporting said first and second ends of said elements for allowing said elements to be placed in tension while reacting with said reaction means; said carriage means including a plurality of independent modules; each of said modules supporting a group of said elements so that each group of said elements react collectively with said reaction means and independently of the groups of other modules; said elements in each of said groups being parallel to one another; said reaction means comprising cam means disposed about a central axis with at least one cam surface disposed about the periphery of said cam means; support means supporting said cam means and said carriage means for allowing relative movement between said cam means and said carriage means to extract energy as said elements unstrain and shorten in length during said second phase; each of said modules including a cam follower for engaging said cam means, and hydraulic means disposed between each of said cam followers and said group of elements of each module for transferring reaction forces between said cam means and said elements of each group.

2. An assembly as set forth in claim 1 wherein said cam means includes a pair of first and second axially spaced cams.

3. An assembly as set forth in claim 2 wherein said hydraulic means includes a plurality of hydraulic packages with each hydraulic package associated with one of said modules.

4. An assembly as set forth in claim 3 wherein the hydraulic package associated with each module is disposed at the ends of the elements in that module opposite from the element ends at which the hydraulic package of the next adjacent module is disposed with said cam followers being similarly alternately disposed from module to module as that said cam followers of a number of modules react with said first cam and the remaining cam followers of the remaining modules react with said second cam.

5. An assembly as set forth in claim 4 wherein said cams are fixed to said support means and said carriage means is rotatably supported by said support means for rotation about said central axis.

6. An assembly as set forth in claim 5 including an output shaft and power take-off means for transmitting the rotational movement of said carriage means to said output shaft.

7. An assembly as set forth in claim 5 wherein said carriage means includes an upper rotating wheel and a lower rotating wheel, said wheels being axially spaced along said central axis.

8. An assembly as set forth in claim 7 wherein each of said modules includes a fixed plate fixedly connected to one of said wheels and movable plate movably attached to the other of said wheels, said elements having the first ends thereof connected to said fixed plate and the second ends thereof connected to said movable plate.

9. An assembly as set forth in claim 8 including guide pins having first ends attached to each of said movable plates and extending through one of said wheels to second ends and supported for sliding movement relative to said wheel, said hydraulic package including a first hydraulic chamber with a first piston movably disposed therein, connecting means interconnecting the second ends of said pins and the associated first piston for creating hydraulic pressure in said first hydraulic chamber in response to said unstraining of said elements.

10. An assembly as set forth in claim 9 wherein each hydraulic package includes a second hydraulic chamber with a second piston disposed therein and a rod interconnecting each of said second pistons and the associated cam follower, fluid communication means establishing fluid communication between said second hydraulic chamber and said first hydraulic chamber of said hydraulic package.

11. An assembly as set forth in claim 10 wherein said first hydraulic piston has a larger area subjected to hydraulic fluid than said second hydraulic piston.

12. An assembly as set forth in claim 11 wherein said first hydraulic piston moves axially and parallel to said central axis and said second hydraulic piston moves radially relative to said central axis.

13. An assembly as set forth in claim 12 wherein said support means includes a first compartment extending in an arc about said central axis for a first portion and a second compartment extending in an arc about said central axis for another adjacent portion, said compartments being disposed radially inwardly of said wires, and passages extending radially from each compartment toward said elements so that fluid may flow through said compartments and said passages to heat and cool said elements as they move about said central axis.

14. An assembly as set forth in claim 13 wherein each of said elements comprises a wire having a circular cross section.

15. An assembly as set forth in claim 14 wherein said first hydraulic chambers are disposed in said wheels.

16. An assembly as set forth in claim 15 including an output shaft rotatably supported by said support means, and power take-off means for transmitting the rotational movement of said carriage means to said output shaft, said power take-off means including a beveled ring gear attached to one of said wheels and a meshing bevel gear attached to said output shaft.

17. An assembly as set forth in claim 16 wherein said support means comprises a housing disposed radially about said carriage means with fluid outlets extending radially to exhaust fluid from the housing, said compartments being defined by said housing.

* * * * *